Nov. 12, 1935.    R. E. SWAIN    2,020,590

METHOD OF MAKING MOLDED ARTICLES

Filed Oct. 7, 1932    2 Sheets-Sheet 1

Inventor
Roy E. Swain
By Lyon & Lyon
Attorneys

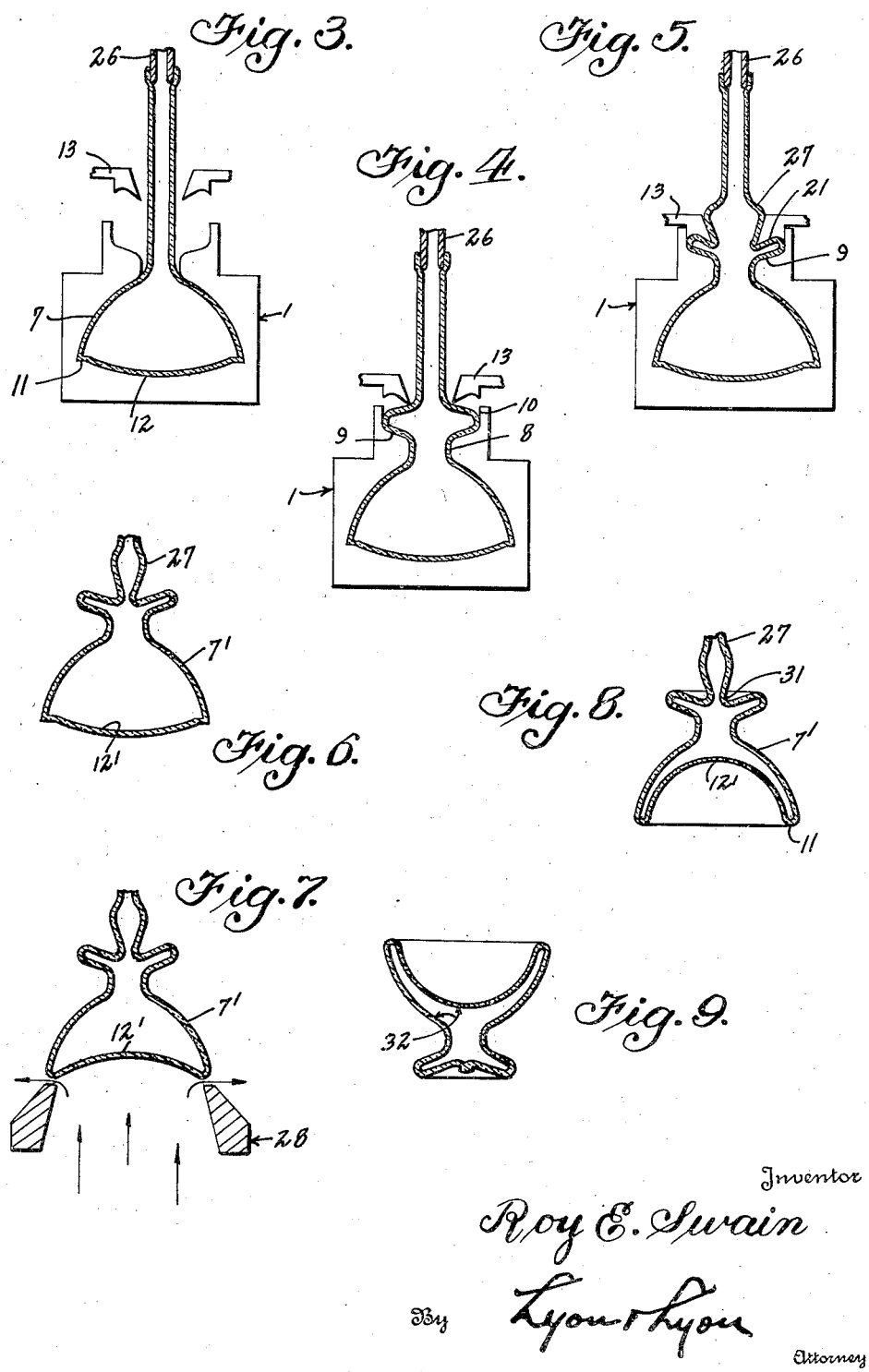

Patented Nov. 12, 1935

2,020,590

UNITED STATES PATENT OFFICE 2,020,590

METHOD OF MAKING MOLDED ARTICLES

Roy E. Swain, Huntington Park, Calif.

Application October 7, 1932, Serial No. 636,633

4 Claims. (Cl. 49—79)

This invention relates to a molded article provided with hollow or double walls, or with hollow flanged sections, made from any suitable raw material, substance or composition capable of becoming plastic and exhibiting plastic flow with increase in temperature. More particularly, the invention relates to the manufacture of articles having adjacent sections of greatly differing diameters or proportions without sacrificing the wall thickness of those sections having the greater diameters. The invention is adapted to the manufacture of hollow-walled or double-walled articles and receptacles, such as glasses, cups, tureens, bowls, vases, jars, etc., from glass, the receptacles of this invention being characterized in that the entire article is integral, being constructed from a single and continuous piece of glass, the glass forming both interior and exterior walls or surfaces.

Heretofore, hollow walled articles such as thermos bottles, have been made of two or more separately molded pieces of glass, these separate pieces being then welded or fused together in appropriate relation. The manufacture of double walled articles in this manner involved many operations and generally resulted in the formation in the article of a zone or section of appreciably greater thickness than other sections. Such inequalities in the wall thicknesses produced strains in the finished articles, thereby rendering the articles subject to breakage with rapid changes in temperature.

Articles made in accordance with this invention, however, are made from a single piece of glass and are therefore free from the zones of increased thickness caused by welding or fusing separate sections together. Moreover, the mode of operation of this invention greatly facilitates the manufacture of hollow walled articles and receptacles, it being unnecessary to separately manufacture different portions of the finished article.

Generally stated, the method of this invention provides for the production of recesses or reentrant surfaces in a molded article by the application of heat and suction in the manner described hereinafter. The invention also provides a novel type of mold or apparatus whereby reentrant surfaces may be formed.

An object of this invention is to disclose and provide a hollow walled or double walled article or receptacle made from a composition or substance capable of exhibiting plastic flow with increase in temperature.

Another object of this invention is to disclose and provide a method of forming hollow or double walled articles and receptacles from compositions capable of exhibiting plastic flow with increase in temperature.

A further object is to disclose and provide a method of forming reentrant surfaces in articles or receptacles molded from compositions capable of exhibiting plastic flow.

These and other objects, uses and advantages of this invention will beome apparent to those skilled in the art from the subsequent detailed description of the method. For purposes of lucidity, the detailed description will be limited to the manufacture of a hollow or double walled compotier made from glass. It is to be understood that any desired type of glass, phenol condensation product, ceramic composition or other substance or composition capable of becoming plastic or exhibiting plastic flow with increase in temperature, may be used in carrying out the method. The invention, furthermore, is not limited to the particular shape or type of dish used for illustrative purposes in the subsequent description nor to the specific form of apparatus there described.

In the appended drawings:

Figs. 3 to 8 illustrate various steps in the manufacture of a compotier in accordance with the method of this invention.

Fig. 9 is a vertical section through the finished compotier resulting from the operation shown in Figs. 2 to 8.

Figure 1:
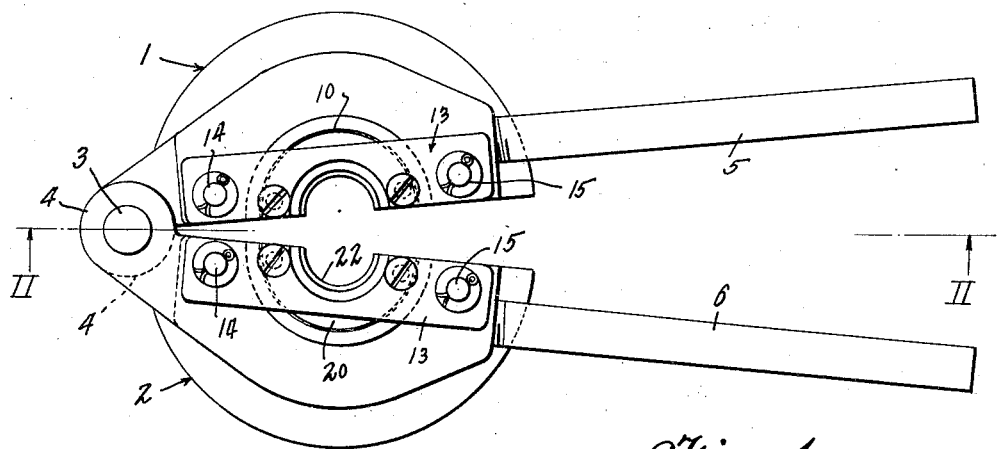
Fig. 1 is a plan view of a hinged mold capable of being used in carrying out the invention.
Figure 2:
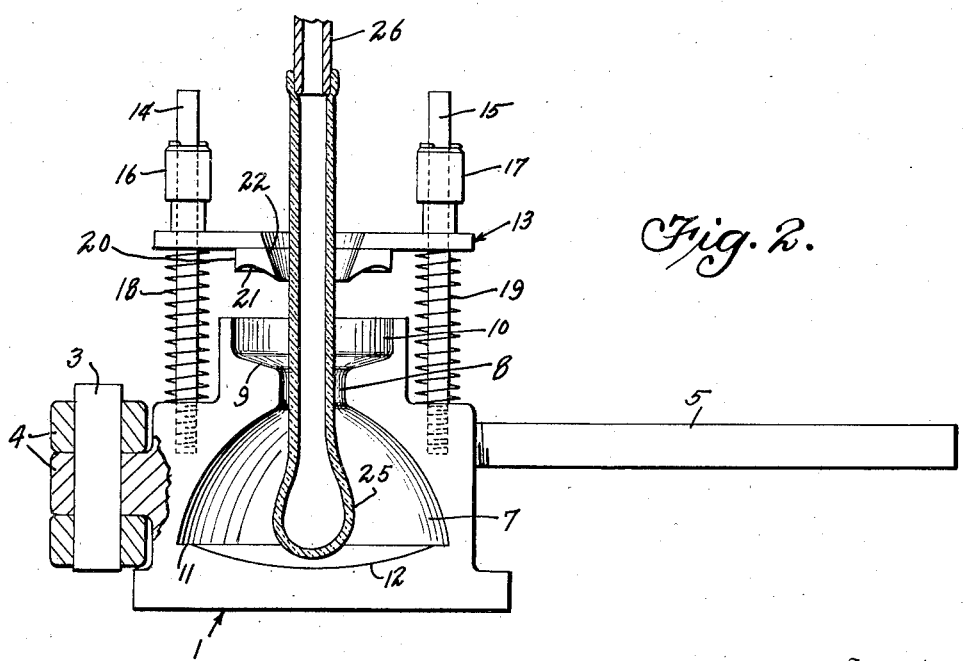
Fig. 2 is a side view of one of the half sections of the mold shown in Fig. 1.

The type of apparatus illustrated in Figs. 1 and 2 is a simplified form consisting merely of two metal half mold sections 1 and 2 hinged together as by means of a pin 3 passing through ears 4 extending from the half mold sections. The half mold sections 1 and 2 are provided with handles 5 and 6 whereby the sections may be opened or closed. The molds may also be provided with eyelets, etc., for dummy or automatic operation. The form of mold shown is suitable for the production of compotiers and each half mold section includes a substantially semi-spherical wall cavity or recess 7, a stem or neck cylindrical section 8, an outwardly inclined upper foot surface section 9, and a cylindrical opening 10. The wall section 7 terminates in a shoulder which may either lie in a plane perpendicular to the axis of the mold cavity or which may take the form of a fillet.

A shoulder 11 is shown in the drawings, this shoulder being substantially twice the width of the finished wall thickness. The spherical wall surfaces 7 and the shoulder 11 are connected by a diaphragm surface 12 which is either flat or transverse to the mold axis or shaped as shown in Fig. 2 so as to produce a convex diaphragm during the molding operation.

Each of the mold half sections 1 and 2 bears a movable clapper mold or clapper section 13, such clapper sections 13 being movable in a direction along the vertical axis of the mold. The half mold section 1, for example, may be provided with vertical pins 14 and 15 passing through apertures and bosses or guides 16 and 17 carried by the clapper section 13. The clapper section 13 is normally maintained in spaced relation to the mold section 1 by means of compression springs 18 and 19.

The clapper section 13 may be provided with a half cylindrical boss 20 adapted to enter into the cylindrical recess or aperture 10 of the half mold section 1. The lower surface of the boss 20 may be downwardly curved as indicated at 21.

The lower and central point of the boss 20 terminates in an axially located half conical recess 22 formed in the clapper member 13. It is to be understood that the height of the boss 20 of the clapper section 13 is so proportioned with respect to the depth of the cylindrical aperture 10 of the mold section as to permit the insertion of the boss into the cylindrical section 10 to a desired degree, the downward movement of the clapper section being arrested when the upper surface of the mold section contacts with the clapper member 13, thus producing a foot or flanged section having a predetermined thickness.

It is to be understood that in the manufacture of the double-walled or hollow articles and receptacles, either the hot mold or paste mold system may be employed. For purposes of illustration, the paste mold system will be described.

The interior surface of the metallic heat-absorbing mold described hereinabove and illustrated in the drawings, is coated with a suitable substance such as, for example, a suspension of carbon in carbonized linseed oil. A ball of glass 25 attached to a blow pipe 26 is inserted into the mold and the mold sections 1 and 2 clamped together. This ball of glass is then blown through the pipe 26 so as to contact with the wall surfaces 7 and the lower connecting diaphragm surface 12 as indicated in Fig. 3.

The diaphragm surface 12 is concaved (so as to form a convex diaphragm section) so as to permit the glass to thoroughly and uniformly expand into the lower corner between the wall surface 7 and the shoulder 11.

The blowing operation is then continued so as to cause the glass to expand and partially fill the stem surfaces 8 and the foot surface 9. Blowing of the glass is preferably continued until the glass touches the cylindrical surface 10 as shown in Fig. 4.

The clapper section 13 of the mold is then lowered, as indicated in Fig. 5, by a downward movement of the pipe, so as to compress the glass and form the lower surface of the foot, the contour of the lower surface being determined by the curvature of the surface 21. It is to be noted that this surface 21 of the clapper member is inclined downwardly towards the axis of the mold, thereby forming a reentrant surface to the foot of the article. The glass is further blown after the clapper section is in depressed position, so as to insure the entire filling of the mold consisting of surfaces 9 and 21 and the distribution of the glass in films of uniform thickness over these surfaces. As all parts of the mold are of metal, no temperature gradients between different portions of the blown article are established.

After the application of pressure by means of the clapper member 13, as indicated in Fig. 5, and the formation of a double-walled foot, the mold sections are separated, the two clapper sections simultaneously moving upwardly, under the influence of the springs 18 and 19, out of contact with the glass and above the highest part of the molded foot. It is to be remembered that the stem 27 should not expand over or overlap the plane upper surface of the clapper 13 so as to prevent the upward angular movement of the clapper during the separation of the mold sections. It is also to be noted that by the operations described above it is possible to form a flange, foot, disc, or other article, provided with space wall sections of uniform thickness in a device which is in the control of a single operator, namely, the blower, who can observe the hot glass through the joint in the mold during blowing, determine when the ball of glass in the foot section has reached a size sufficient to form the flange, depress his pipe so as to cause the clappers to move down upon the ball and thereby completely control the entire operation. The tubular section 27 connecting the partially molded article with the blow pipe 26 is then constructed by means of chimney tools, or the like, as indicated in Fig. 6.

It is to be noted that at this point the article is provided with the desired outside wall surfaces, stem surfaces and foot surfaces. The diaphragm 12' connecting the wall surfaces 7' is then subjected to the action of heat, preferably to the action of a blast of heated gases. Only a limited area of the diaphragm 12' should be heated or rendered plastic, the edges of the diaphragm, such as the edge formed by the shoulder 11, remaining unheated and relatively cool so as to prevent the deformation of such edge. Moreover, it is highly desirable that the center portion of the diaphragm 12' is subjected to a more intense heat than the outer portions.

Fig. 7 illustrates one method whereby the diaphragm 12' may be suitably heated. The molded article, shown in Fig. 6, is preferably brought against a nozzle, indicated at 28, so that the portion formed by the shoulder 11 of the original mold is protected by and in slightly spaced relation to the nozzle. A limited area of the diaphragm 12' is then subjected to the action of heat, preferably heated gases supplied from a source not shown, such heated gases causing the diaphragm 12' to become plastic and to move inwardly so as to assume the position shown in Fig. 7. Excess gases pass out radially from the nozzle, whereby a sharp temperature gradient is caused to exist at the edge 11' of the article.

The nozzle may be set into the walls of a suitable furnace, or may be positioned above a blast burner or the like. Those skilled in the art will appreciate that the apparatus may assume a number of different forms and for this reason a detailed description need not be given here.

The article shown in Fig. 7 may then be removed from the blast nozzle and suction applied to the interior of the article while the diaphragm 12' is still in a plastic condition. A reduction of pressure within the molded article resulting from the application of suction to the blow pipe 26 will cause the diaphragm 12' to move inwardly towards the side walls 7', the suction being maintained until the diaphragm 12' assumes a desired position with respect to the side walls 7', for example, a position indicated in Fig. 8; or the diaphragm may be partially retracted by suction, heat again applied to the center of the diaphragm by any suitable means, and suction again applied to deepen the cavity.

It is to be noted that the molded article now resembles a compotier provided with double walls. The stem 27 is then pinched off from the molded article, preferably at a point indicated at 31 in Fig. 8, and the molded article then annealed. Thereafter, the internal or external surfaces of the article may be suitably decorated. For example, the internal surfaces, indicated at 32, may be silvered, plated, enameled, or covered in any suitable manner with a desired decorating composition or substance. At the completion of the decorating operation, the interior of the vessel or the space between the double walls thereof may be evacuated by the application of suction through the restricted aperture in the foot and the evacuated vessel then sealed. Fig. 9 illustrates the finished article in vertical section. It is to be noted that the article is a complete, stable, self-supporting product, requiring no holders, feet or other foundation means. Double walled thermos bottles have been made heretofore but such articles have been made by double pressing operations, were not free from evacuation tips, and necessitated the use of a case or holder which permitted the article to stand upright. The term "complete" as used in the claims, refers to a container made in accordance with the method herein defined, such container not requiring feet or other added attached or fitted foundation means.

It will be obvious to those skilled in the art that a novel method of forming reentrant surfaces in hollow walled articles or receptacles has been provided, such method being applicable to the manufacture of numerous forms of articles or flanged sections having uniform wall thickness, from all compositions or substances capable of exhibiting plastic flow with increase in temperature. The word "glass" as used in the claims is to be understood as embracing all compositions or substances having the characteristics above stated.

All such changes and modifications as come within the scope of the appended claims are embraced thereby.

I claim:

1. A method of making evacuated hollow-walled articles of glass without removing the same from a blow pipe, which comprises: inserting a prepared blank of glass attached to a pipe into a mold, blowing the glass within the mold so as to form wall sections and a convex diaphragm connecting the wall sections, moving a portion of the mold by downward movement of the pipe to form a pair of spaced substantially conical surfaces, subjecting an area of the diaphragm spaced from the outer edges thereof to the action of heated gases while maintaining the blown glass attached to the pipe, applying suction to the interior of the blown glass through said pipe to convert said convex diaphragm into a reentrant surface spaced from the wall sections and to partially evacuate the interior of the article, and finally removing the completed article from the pipe by constricting, sealing and cutting the glass adjacent the pipe.

2. A method of making evacuated hollow-walled articles of glass without removing the same from a blow pipe, which comprises: inserting a prepared blank of glass attached to a pipe into a mold, blowing the glass within the mold so as to form wall sections and a convex diaphragm connecting the wall sections, moving a portion of the mold by downward movement of the pipe to form a pair of spaced substantially conical surfaces, then removing the blown glass from the mold while still attached to the pipe, subjecting an area of the diaphragm spaced from the outer edges thereof to the action of heated gases while maintaining the blown glass attached to the pipe, applying suction to the interior of the blown glass through said pipe to convert said convex diaphragm into a reentrant surface spaced from the wall sections and to partially evacuate the interior of the article, and finally removing the completed article from the pipe by constricting, sealing and cutting the glass adjacent the pipe.

3. A method of making evacuated hollow-walled articles of glass without removing the same from a blow pipe, which comprises: inserting a prepared blank of glass attached to a pipe into a mold, blowing the glass within the mold so as to form wall sections and a convex diaphragm connecting the wall sections, moving a portion of the mold by downward movement of the pipe to form a pair of spaced substantially conical surfaces, subjecting an area of the diaphragm spaced from the outer edges thereof to the action of heated gases while maintaining the blown glass attached to the pipe, applying suction to the interior of the blown glass through said pipe to convert said convex diaphragm into a reentrant surface spaced from the wall sections and to partially evacuate the interior of the blown glass article, and finally constricting and sealing the glass adjacent the pipe to form a complete evacuated article.

4. A method of making evacuated hollow-walled articles of glass without removing the same from a blow pipe, which comprises: inserting a prepared blank of glass attached to a pipe into a split mold having a relatively small inlet, blowing the glass within the mold so as to form wall sections and a convex diaphragm connecting the wall sections, moving a portion of the mold a predetermined and limited distance by downward movement of the pipe against said relatively small inlet to form a pair of spaced substantially conical surfaces, then removing the blown glass from the mold while still attached to the pipe, subjecting an area of the diaphragm spaced from the outer edges thereof to the action of heated gases, applying suction to the interior of the blown glass through the said pipe to convert said diaphragm into a reentrant surface spaced from the wall sections and to partially evacuate the blown glass article, and finally constricting and sealing the glass adjacent the pipe to form a complete evacuated article.

ROY E. SWAIN.